US012809839B2

(12) United States Patent
Jin et al.

(10) Patent No.: US 12,809,839 B2
(45) Date of Patent: Nov. 24, 2026

(54) METHODS AND APPARATUSES FOR WRITING AND SEARCHING VECTOR DATA IN VECTOR DATABASE

(71) Applicant: Alipay (Hangzhou) Information Technology Co., Ltd., Hangzhou (CN)

(72) Inventors: Jiabao Jin, Hangzhou (CN); Xiangyu Wang, Hangzhou (CN); Yue Li, Hangzhou (CN); Jianguang Shi, Hangzhou (CN); Yao Zhang, Hangzhou (CN); Yanze Liu, Hangzhou (CN); Hongbin Zhang, Hangzhou (CN); Yupeng Li, Hangzhou (CN); Zekun Liu, Hangzhou (CN); Zhitao Shen, Hangzhou (CN); Wei Jia, Hangzhou (CN); Ruoyi Ruan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/979,904

(22) Filed: Dec. 13, 2024

(65) Prior Publication Data

US 2026/0003845 A1 Jan. 1, 2026

(30) Foreign Application Priority Data

Jun. 28, 2024 (CN) ......................... 202410871730.2

(51) Int. Cl.

| | |
|---|---|
| ***G06F 16/22*** | (2019.01) |
| ***G06F 16/25*** | (2019.01) |
| ***G06F 16/901*** | (2019.01) |

(52) U.S. Cl.

CPC ...... *G06F 16/2237* (2019.01); *G06F 16/2246* (2019.01); *G06F 16/258* (2019.01); *G06F 16/9024* (2019.01)

(58) Field of Classification Search

CPC ............. G06F 16/2237; G06F 16/2246; G06F 16/258; G06F 16/9024

(Continued)

(56) References Cited

U.S. PATENT DOCUMENTS 11,416,465 B1 * 8/2022 Anwar .................. G06F 16/285
2021/0279205 A1 * 9/2021 Irazabal ................ G06F 16/137

(Continued)

FOREIGN PATENT DOCUMENTS

CN 111797096 A * 10/2020 ............. G06F 16/27
CN 112966007 A 6/2021

(Continued)

OTHER PUBLICATIONS

Hezel et al., Fast Approximate Nearest Neighbor Search with a Dynamic Exploration Graph using Continuous Refinement, arXiv: 2307.10479, 2023. (Year: 2023).*

(Continued)

*Primary Examiner* — Cheyne D Ly
(74) *Attorney, Agent, or Firm* — Fish & Richardson P.C.

(57) ABSTRACT

The present disclosure provides methods and apparatuses for writing and searching vector data in a vector database. An example method includes receiving a write request for writing target vector data into a vector database, adding index update information corresponding to the target vector data to a first index of the vector database in a memory table, where the first index is a memory-based real-time read-write vector graph index, in response to flushing the memory table to a disk, writing the index update information of the first index in the memory table into a distributed file system, and converting the first index in the distributed file system into a second index, where the second index is a disk-based vector graph index.

20 Claims, 7 Drawing Sheets

(58) Field of Classification Search
USPC .......................................................... 707/741
See application file for complete search history.

(56) References Cited

U.S. PATENT DOCUMENTS

| | | | | |
|---|---|---|---|---|
| 2025/0005896 | A1* | 1/2025 | Liu | G06V 10/82 |
| 2025/0013620 | A1* | 1/2025 | Zhu | G06F 16/2453 |
| 2025/0077793 | A1* | 3/2025 | Colgan | G06F 16/3347 |
| 2025/0225132 | A1* | 7/2025 | Li | G06F 16/285 |

FOREIGN PATENT DOCUMENTS

| | | | | | |
|---|---|---|---|---|---|
| CN | 113656406 | A | * | 11/2021 | G06F 16/2272 |
| CN | 115129939 | A | | 9/2022 | |
| CN | 115757967 | A | * | 3/2023 | |
| CN | 116701469 | A | * | 9/2023 | G06F 16/24552 |
| WO | WO-2024065692 | A1 | * | 4/2024 | G06F 16/2237 |

OTHER PUBLICATIONS cloud.tencent.com [online], "Indexing and Computing," available on or before May 7, 2024, via Internet Archive: Wayback Machine URL<https://web.archive.org/web/20240507224702/https://cloud.tencent.com/document/product/1709/95428>, retrieved on May 27, 2025, retrieved from URL<https://cloud.tencent.com/document/product/1709/95428>, 9 pages (with English machine translation).
Extended European Search Report in European Appln. No. 24220009.5, mailed on Apr. 28, 2025, 13 pages.
github.com [online], "baidu/puck: Puck is a high-performance ANN search engine," available on or before May 27, 2025, via Internet Archive: Wayback Machine URL<https://web.archive.org/web/20250527204011/https://github.com/baidu/puck/tree/main>, retrieved on May 27, 2025, retrieved from URL<https://github.com/baidu/puck/tree/main>, 6 pages.
github.com [online], "SPTAG: A library for fast approximate nearest neighbor search," available on or before May 23, 2024, via Internet Archive: Wayback Machine URL<https://web.archive.org/web/20240523022647/https://github.com/microsoft/SPTAG>, retrieved on May 27, 2025, retrieved from URL<https://github.com/microsoft/SPTAG>, 7 pages.
Pan et al., "Survey of Vector Database Management Systems," CoRR, Submitted on Oct. 21, 2023, arXiv:2310.14021v1, 25 pages.
tech.meituan.com [online], "Meituan Takeaway's GPU-based vector retrieval system practice," available on or before Jun. 3, 2024, via Internet Archive: Wayback Machine URL<https://web.archive.org/web/20240603050507/https://tech.meituan.com/2024/04/11/gpu-vector-retrieval-system-practice.html>, retrieved on May 27, 2025, retrieved from URL<https://tech.meituan.com/2024/04/11/gpu-vector-retrieval-system-practice.html>, 19 pages (with English machine translation).
volcengine.com [online], "create," Apr. 17, 2024, retrieved on May 27, 2025, retrieved from URL<https://www.volcengine.com/docs/84313/1254531>, 12 pages (with English machine translation).
Wang et al., "Starling: An I/O-Efficient Disk-Resident Graph Index Framework for High-Dimensional Vector Similarity Search on Data Segment," Proceedings of the ACM on Management of Data (SIGMOD), Mar. 26, 2024, 2(1):14, 27 pages.
Zhang et al., "GRIP: Multi-Store Capacity-Optimized High-Performance Nearest Neighbor Search for Vector Search Engine," Paper, Presented at the proceedings of the 28th ACM International Conference on Information and Knowledge Management (CIKM'19), Beijing, China, Nov. 3-7, 2019; ACM, Nov. 3, 2019, pp. 1673-1682.

* cited by examiner

METHODS AND APPARATUSES FOR WRITING AND SEARCHING VECTOR DATA IN VECTOR DATABASE

CROSS-REFERENCE TO RELATED APPLICATIONS

This application claims priority to Chinese Patent Application No. 202410871730.2, filed on Jun. 28, 2024, which is hereby incorporated by reference in its entirety.

TECHNICAL FIELD

One or more embodiments of this specification relate to the field of computers, and in particular, to methods and apparatuses for writing and searching vector data in a vector database.

BACKGROUND

A vector database is a database having functions of storing and querying vector data, and the vector data stored therein can be derived from vectorization of text, voice, images, videos, etc. Compared with conventional databases, the vector database can process more unstructured data, such as images and audio. Vector data are often used in machine learning and deep learning, that is, data are usually represented in a vector form. The vector data can belong to a representation of privacy data of a user. For example, the vector data can come from vectorization of a face image or vectorization of a fingerprint image, and the face image and the fingerprint image are often considered as privacy data.

When searching vector data, the vector database focuses primarily on similarity calculation between vectors rather than on exact matching. When writing vector data, a vector index needs to be constructed. The vector index refers to a data structure established in the vector database to accelerate similarity search. In the existing technology, a solution for writing vector data into a vector database and a solution for searching vector data in a vector database often cannot consider both real-time performance and storage costs for large-scale vector data.

SUMMARY

One or more embodiments of this specification describe methods and apparatuses for writing and searching vector data in a vector database, which can consider both real-time performance and storage costs.

According to a first aspect, a method for writing vector data into a vector database is provided, including: receiving a write request for target vector data; adding index update information corresponding to the target vector data to a dynamic first index of a vector database in a memory table, where the first index is a memory-based real-time read-write vector graph index; when the memory table is flushed to a disk, storing the index update information of the dynamic first index in the memory table into a distributed file system to obtain a static first index; and converting the static first index in the distributed file system into a second index, where the second index is a disk-based low-cost vector graph index.

In some possible implementations, the method further includes: combining multiple second indexes whose data volumes are less than a target value into one second index whose data volume is greater than or equal to the target value.

In a possible implementation, the first index is a Hierarchical Navigable Small World (HNSW) index, and the second index is a Disk Approximate Nearest Neighbor (DiskANN) index.

Further, the index update information includes update of an adjacency relationship in the HNSW index and/or adjustment of a hierarchical structure of multiple hierarchical graphs.

Further, the converting the static first index in the distributed file system into a second index includes: obtaining a graph structure of a bottom layer in a static HNSW index in the distributed file system, and using the graph structure as a graph structure in DiskANN; obtaining each piece of vector data included in the vector database, and generating a compression vector respectively corresponding to each piece of vector data; and constructing an index file of the second index based on the graph structure and the compression vector, and storing the index file into the distributed file system.

According to a second aspect, a method for searching vector data in a vector database is provided, including: receiving a search request for target vector data; and performing target search based on the target vector data, so as to determine a search result, where the target search includes: separately performing vector search by using a dynamic first index stored in a memory, and a static first index and a second index stored in a distributed file system, and combining results obtained after respective search as a matching result set, where the first index is a memory-based real-time read-write vector graph index, the second index is a disk-based low-cost vector graph index, and the second index is obtained by converting a first index dumped from the memory to a disk.

In a possible implementation, multiple data rows are stored in the vector database, one data row includes data columns respectively corresponding to multiple types of data, and the multiple types of data include vector data and another type of data.

Further, the search request further includes a filtering search criterion for another type of data; and the target search further includes: after the vector search, obtaining a filtering result set in a filter manner according to the filtering search criterion; and filtering the matching result set by using the filtering result set, and determining a search result according to a filtering result.

Further, the search request further includes a filtering search criterion for another type of data; and the target search further includes: before the vector search, obtaining a filtering result set in a filter manner according to the filtering search criterion; and the vector search includes performing search, by using the first index and the second index, in a sub-search range corresponding to the filtering result set to obtain the matching result set.

Further, the obtaining a filtering result set in a filter manner according to the filtering search criterion includes: obtaining several row numbers through searching according to at least one other type of data included in the filtering search criterion, where the row number is used to identify the data row; and determining, as the filtering result set, the several row numbers or vector data of target data columns included in several data rows corresponding to the several row numbers.

Further, the target search obtains several row numbers matching the target vector data, where the row number is used to identify the data row; and the determining a search result includes: obtaining data information of several target data columns in data rows corresponding to the matched several row numbers and postprocessing information thereof, where the postprocessing information includes statistical information in a search process.

According to a third aspect, an apparatus for writing vector data into a vector database is provided, including: a proxy server, configured to receive a write request for target vector data; a search node, configured to add index update information corresponding to the target vector data received by the proxy server to a dynamic first index of a vector database in a memory table, where the first index is a memory-based real-time read-write vector graph index; a data integration engine, configured to: when the memory table is flushed to a disk, store the index update information of the dynamic first index in the memory table and added by the search node into a distributed file system to obtain a static first index; and a storage engine, configured to convert the static first index in the distributed file system and obtained by the data integration engine into a second index, where the second index is a disk-based low-cost vector graph index.

According to a fourth aspect, an apparatus for searching vector data in a vector database is provided, including: a proxy server, configured to receive a search request for target vector data; and a search node, configured to perform target search based on the target vector data received by the proxy server, so as to determine a search result, where the target search includes: separately performing vector search by using a dynamic first index stored in a memory, and a static first index and a second index stored in a distributed file system, and combining results obtained after respective search as a matching result set, where the first index is a memory-based real-time read-write vector graph index, the second index is a disk-based low-cost vector graph index, and the second index is obtained by converting a first index dumped from the memory to a disk.

According to a fifth aspect, a computer-readable storage medium is provided. The computer-readable storage medium stores a computer program, and when the computer program is executed in a computer, the computer is enabled to perform the method according to the first aspect or the second aspect.

According to a sixth aspect, a computing device is provided, including a storage device and a processor. The storage device stores executable code, and the processor executes the executable code to implement the method according to the first aspect or the second aspect.

According to the method and the apparatus for writing vector data into a vector database provided in the embodiments of this specification, first, a write request for target vector data is received; then, index update information corresponding to the target vector data is added to a dynamic first index of a vector database in a memory table, where the first index is a memory-based real-time read-write vector graph index; further, when the memory table is flushed to a disk, the index update information of the dynamic first index in the memory table is stored into a distributed file system to obtain a static first index; and finally, the static first index in the distributed file system is converted into a second index, where the second index is a disk-based low-cost vector graph index. It can be understood from the above-mentioned description that in the embodiments of this specification, a distributed file system is used to replace local storage, and can be adapted to large-scale vector data. In addition, a composite index solution is used, and a static first index in the distributed file system is converted into a second index, so memory space is released. Subsequently, the first index can be used to service real-time incremental vector data, and the second index can be used to service historical vector data, so both real-time performance and storage costs can be considered.

According to the method and the apparatus for searching vector data in a vector database provided in the embodiments of this specification, first, a search request for target vector data is received; and then, target search is performed based on the target vector data, so as to determine a search result, where the target search includes: separately performing vector search by using a dynamic first index stored in a memory, and a static first index and a second index stored in a distributed file system, and combining results obtained after respective search as a matching result set, where the first index is a memory-based real-time read-write vector graph index, the second index is a disk-based low-cost vector graph index, and the second index is obtained by converting a first index dumped from the memory to a disk. It can be understood from the above-mentioned description that, in the embodiments of this specification, when searching the vector data, both the first index and the second index are used, thereby giving play to advantages of the first index and the second index, thereby enabling both real-time performance and storage costs to be considered.

BRIEF DESCRIPTION OF DRAWINGS

To describe the technical solutions in the embodiments of the present disclosure more clearly, the following briefly describes the accompanying drawings needed for describing the embodiments. Clearly, the accompanying drawings in the following description show merely some embodiments of the present disclosure, and a person of ordinary skill in the art can still derive other drawings from these accompanying drawings without creative efforts.

DESCRIPTION OF EMBODIMENTS

The following describes the solutions provided in this specification with reference to the accompanying drawings.

Figure 1:
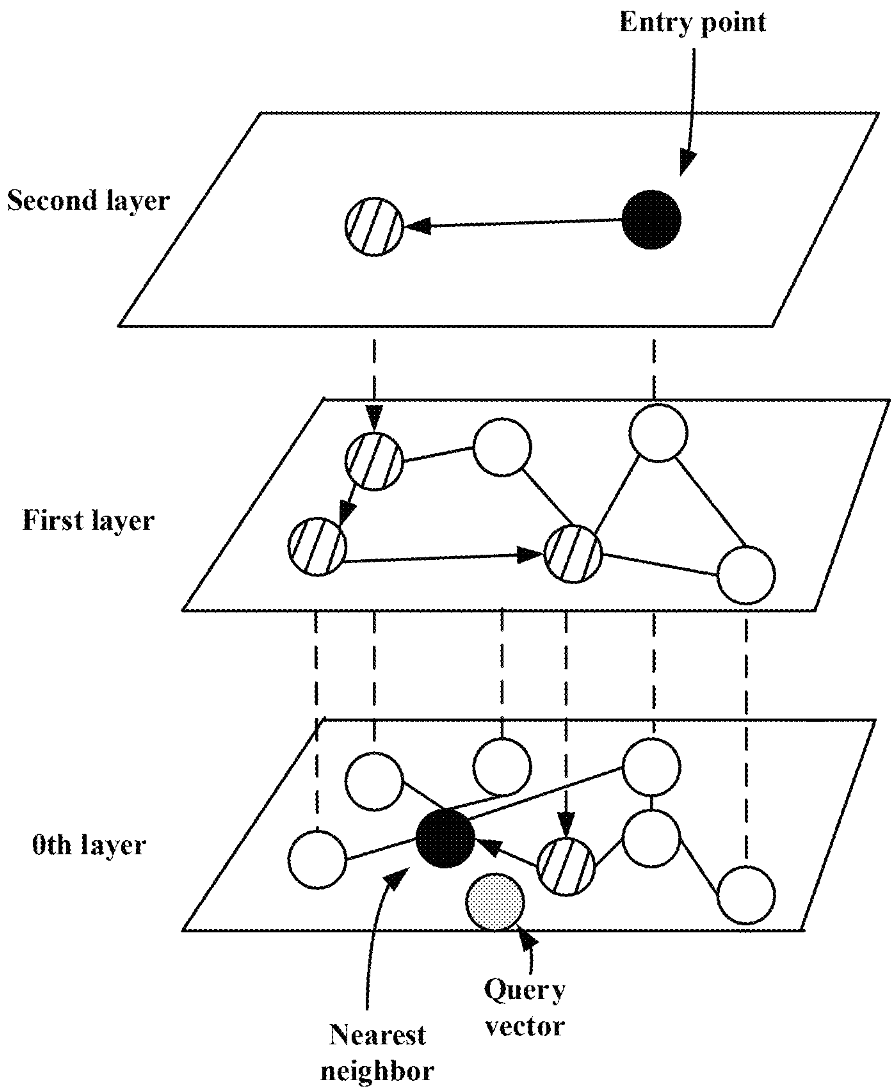
FIG. 1 is a schematic diagram illustrating an implementation scenario of an embodiment, according to this specification.

FIG. 1 is a schematic diagram illustrating an implementation scenario of an embodiment, according to this specification. The implementation scenario involves writing vector data into a vector database and searching vector data in the vector database. It can be understood that large-scale vector data are stored in the vector database, for example, the scale of which can reach a level of hundreds of billions of vectors. When one piece of vector data is written into the vector database, an index of the vector database needs to be updated, so as to subsequently search the vector data based on the index. A specific used index manner directly affects performance of the vector database.

A common index manner is a memory-based real-time read-write vector graph index, and typically is a Hierarchical Navigable Small World (HNSW) index. Another common index manner is a disk-based low-cost vector graph index, and typically is a Disk Approximate Nearest Neighbor (DiskANN) index. The two index manners have advantages and disadvantages. The HNSW index can basically use only a full-memory storage manner. Once data are written to a disk, performance thereof is basically unacceptable because multiple rounds of random read/write are involved in a retrieval process. The HNSW index has good flexibility in index construction, but is only applicable to a scenario with a small quantity of data, and storage costs are high in a massive data scenario. The DiskANN index is applicable to a scenario with large-scale data, and storage costs are low. Unlike the conventional single index manner, in the embodiments of this specification, a composite index solution is used, so both real-time performance and storage costs can be considered.

Referring to FIG. 1, a schematic diagram of the HNSW index is shown. In some embodiments of this specification, a process of searching vector data based on an index is briefly described by using the HNSW index as an example. The HNSW index is a proximity graph, where two vertices are connected according to their proximity, and there is an edge between two vertices that are relatively close to each other. An approximate distance is generally defined by using a Euclidean distance. In the process of searching vector data, a hierarchical graph of the HNSW index is used, the top layer is an entry point and includes only a relatively long edge. As moving to a lower layer, an edge length becomes shorter and shorter, and edges become more and more. In the search process, the top layer is entered first. Near neighbors of a current point are traversed in each layer, a vertex closest to a query vector is greedily moved to until a local optimal solution of a current layer is found. In this case, a current vertex in a lower layer is transferred to, and search starts again. This process is repeated until a local optimal solution of the bottom layer is found. For example, the top layer is the second layer. Starting from an entry point of the second layer, a vertex corresponding to a local optimal solution of the second layer, a current vertex in the first layer, a vertex corresponding to a local optimal solution of the first layer, a current vertex in the Oth layer, and a vertex (where the vertex is a neighbor closest to the query vector) corresponding to a local optimal solution of the Oth layer are successively found in a direction of an arrow, and it can be understood that the Oth layer is the bottom layer.

It is worthwhile to note that this embodiment of this specification is not limited to the index manner of the HNSW index. In FIG. 1, the process of searching vector data based on a graph index is briefly described only by using the index manner as an example.

Figure 2:
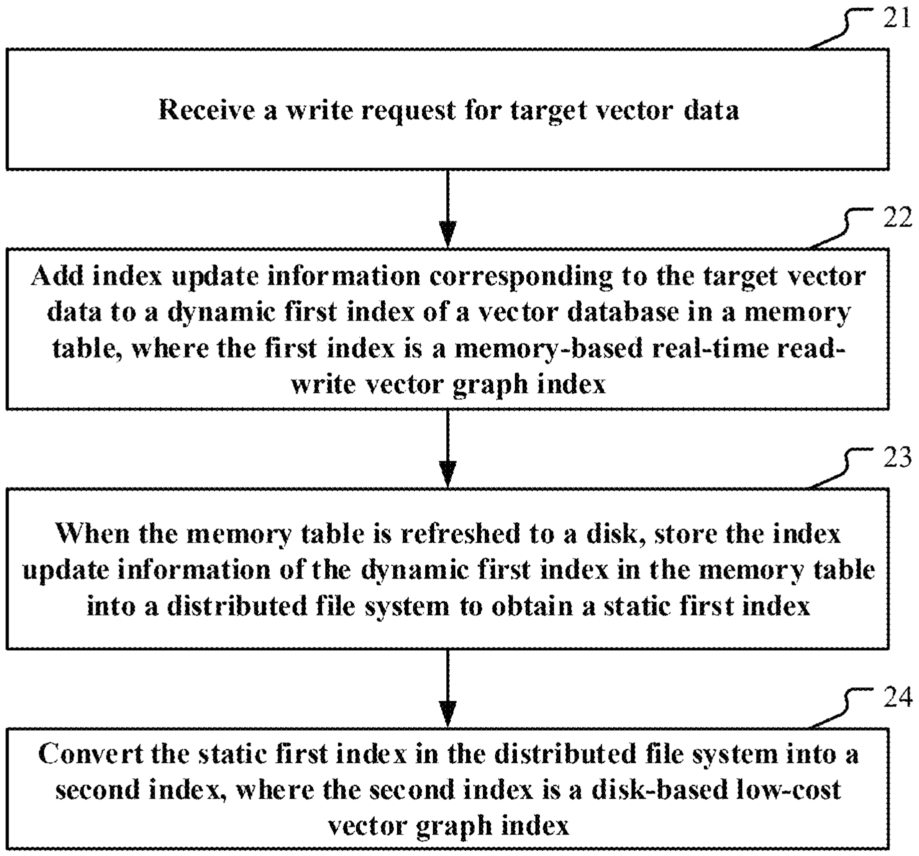
FIG. 2 is a flowchart illustrating a method for writing vector data into a vector database, according to an embodiment.

FIG. 2 is a flowchart illustrating a method for writing vector data into a vector database, according to an embodiment. The method can be based on the implementation scenario shown in FIG. 1. As shown in FIG. 2, the method for writing vector data into a vector database in some embodiments includes the following steps: Step 21: Receive a write request for target vector data; Step 22: Add index update information corresponding to the target vector data to a first index of a vector database in a memory table, where the first index is a memory-based real-time read-write vector graph index; Step 23: When the memory table is flushed to a disk, store the index update information of the first index in the memory table into a distributed file system to obtain an updated first index; and Step 24: Convert the updated first index in the distributed file system into a second index, where the second index is a disk-based low-cost vector graph index. The following describes specific execution manners of the above-mentioned steps.

First, in step 21, a write request for target vector data is received. It can be understood that vector data in the vector database can be written in batches, that is, before the target vector data are written, multiple pieces of vector data may already exist in the vector database.

For example, a total of 1000 pieces of vector data n1 to n1000 have been stored in the vector database, and a write request for vector data n1001 is further received.

Then, in step 22, index update information corresponding to the target vector data is added to a dynamic first index of the vector database in a memory table, where the first index is a memory-based real-time read-write vector graph index. It can be understood that the first index can be established and updated step by step. When new vector data need to be added to an existing data set, index update information can be added to the first index.

In an example, the first index is an HNSW index. Optionally, the first index can be an NSG index or an NSSG index.

Further, the index update information includes update of an adjacency relationship in the HNSW index and/or adjustment of a hierarchical structure of multiple hierarchical graphs.

Next, in step 23, when the memory table is flushed to a disk, the index update information of the dynamic first index in the memory table is stored into a distributed file system to obtain a static first index. It can be understood that due to a limitation on a storage capacity of the memory table, after a size of the memory table exceeds a predetermined value, the memory table can be flushed to a disk, so storage is persisted.

In some embodiments of this specification, the distributed file system is used to replace local storage and can be adapted to large-scale vector data.

Finally, in step 24, the static first index in the distributed file system is converted into a second index, where the second index is a disk-based low-cost vector graph index. It can be understood that not all first indexes are converted into second indexes. For real-time incremental vector data, a dynamic first index is further reserved, so as to implement hybrid indexes.

In some examples, the method further includes: combining multiple second indexes whose data volumes are less than a target value into one second index whose data volume is greater than or equal to the target value.

In this example, when the first index is flushed to the distributed file system, this part of first index is quickly converted into a second index, and when there are multiple second indexes whose data volumes are less than a target value, they are combined into one second index whose data volume is greater than or equal to the target value.

In an example, the second index is a DiskANN index. Optionally, the second index can be a SCANN index.

Further, the converting the static first index in the distributed file system into a second index includes: obtaining a graph structure of a bottom layer in a static HNSW index in the distributed file system, and using the graph structure as a graph structure in DiskANN; obtaining each piece of vector data included in the vector database, and generating a compression vector respectively corresponding to each piece of vector data; and constructing an index file of the second index based on the graph structure and the compression vector, and storing the index file into the distributed file system.

In this example, a product quantization algorithm such as PQ or OPQ can be used to compress an original vector to obtain a compression vector, where the compression vector is used for rough search, and the original vector is used for exact distance calculation.

According to the method for writing vector data into a vector database provided in the embodiments of this specification, first, a write request for target vector data is received; then, index update information corresponding to the target vector data is added to a dynamic first index of a vector database in a memory table, where the first index is a memory-based real-time read-write vector graph index; further, when the memory table is flushed to a disk, the index update information of the dynamic first index in the memory table is stored into a distributed file system to obtain a static first index; and finally, the static first index in the distributed file system is converted into a second index, where the second index is a disk-based low-cost vector graph index. It can be understood from the above-mentioned description that in the embodiments of this specification, a distributed file system is used to replace local storage, and can be adapted to large-scale vector data. In addition, a composite index solution is used, and a static first index in the distributed file system is converted into a second index, so memory space is released. Subsequently, the first index can be used to service real-time incremental vector data, and the second index can be used to service historical vector data, so both real-time performance and storage costs can be considered.

Figure 3:
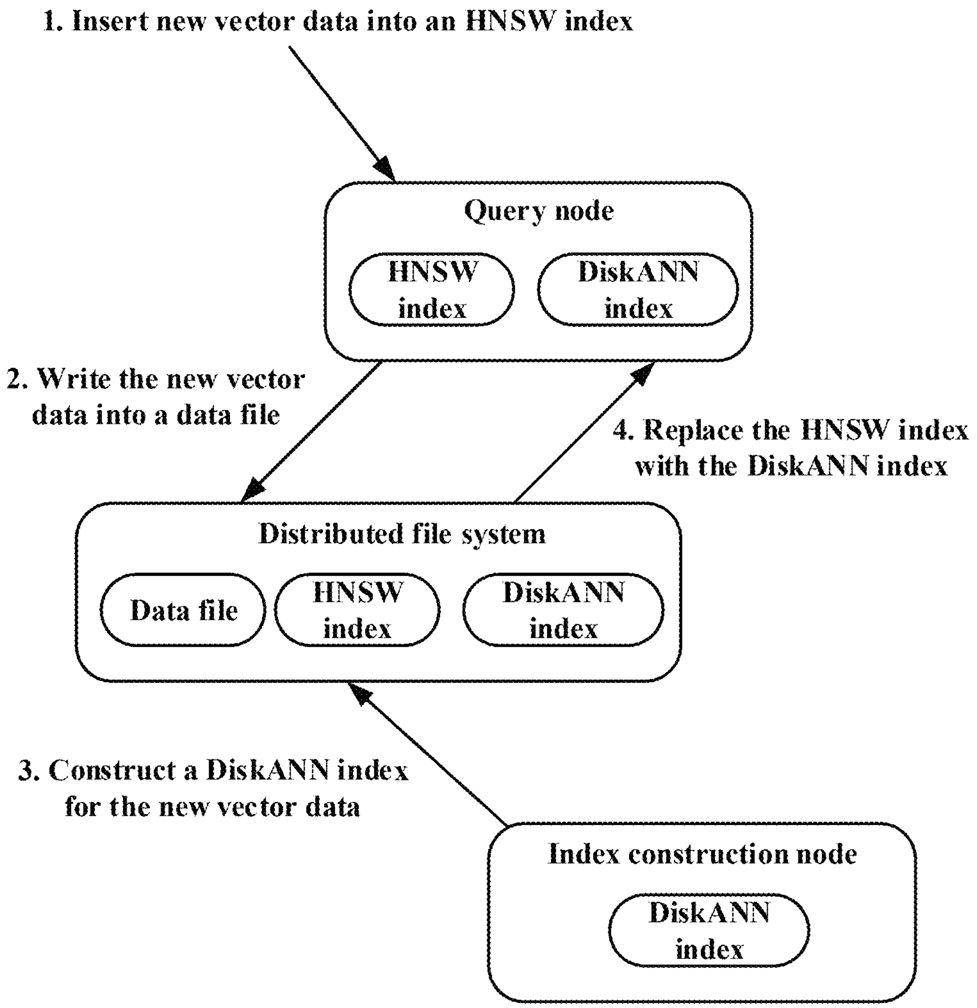
FIG. 3 is a schematic diagram illustrating a processing process of writing vector data into a vector database, according to an embodiment.

FIG. 3 is a schematic diagram illustrating a processing process of writing vector data into a vector database, according to an embodiment. Referring to FIG. 3, first, a query node (which can also be referred to as a search node) inserts new vector data into an HNSW index and sends the new vector data to a distributed file system, and then the distributed file system writes the new vector data into a data file. Then, an index construction node constructs a DiskANN index for the new vector data, and sends the DiskANN index to the distributed file system. Finally, the distributed file system sends the DiskANN index to the query node, and the query node replaces the HNSW index with the DiskANN index, thereby releasing memory space.

In some embodiments of this specification, the following second index construction procedure can be used: The query node obtains an IP address of the index construction node from a control node and sends a request including data metadata information to the index construction node, and the index construction node executes a DiskANN index construction task, queries a periodic node polling result, loads the DiskANN index, and unloads the HNSW index.

Figure 4:
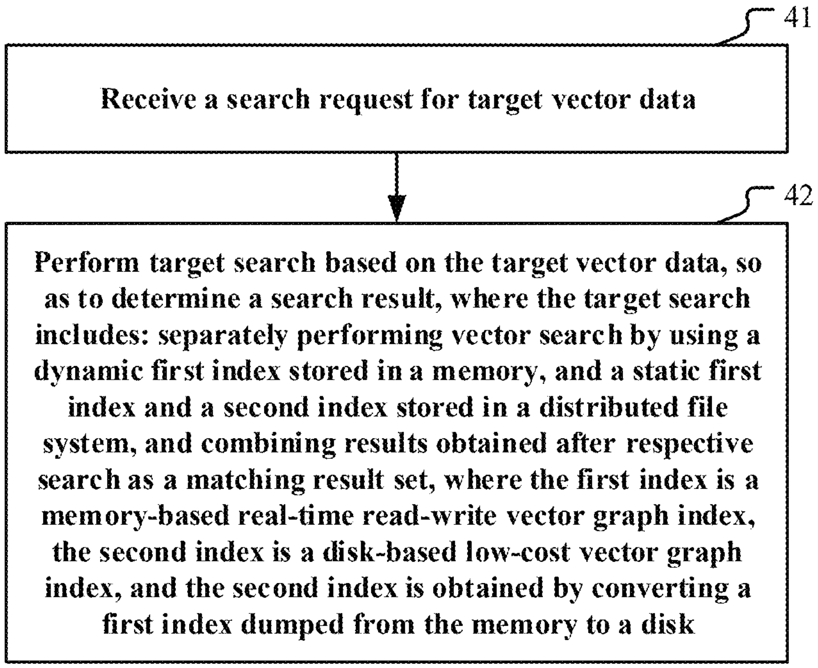
FIG. 4 is a flowchart illustrating a method for searching vector data in a vector database, according to an embodiment.

FIG. 4 is a flowchart illustrating a method for searching vector data in a vector database, according to an embodiment. The method can be based on the implementation scenario shown in FIG. 1 and the method for writing vector data into a vector database shown in FIG. 2. As shown in FIG. 4, the method for searching vector data in a vector database in some embodiments includes the following steps:

Step 41: Receive a search request for target vector data; and Step 42: Perform target search based on the target vector data, so as to determine a search result, where the target search includes: separately performing vector search by using a dynamic first index stored in a memory, and a static first index and a second index stored in a distributed file system, and combining results obtained after respective search as a matching result set, where the first index is a memory-based real-time read-write vector graph index, the second index is a disk-based low-cost vector graph index, and the second index is obtained by converting a first index dumped from the memory to a disk. The following describes specific execution manners of the above-mentioned steps.

First, in step 41, a search request for target vector data is received. It can be understood that the target vector data can represent an image, a video frame, etc.

In an example, multiple data rows are stored in the vector database, one data row includes data columns respectively corresponding to multiple types of data, and the multiple types of data include vector data and another type of data.

In this example, there is an association between data columns in the same data row, and multi-mode hybrid search can be implemented. The another type of data can include text data, scalar data, document data, etc., where the document data can be JSON data. Table 1 below shows an example of a data row and a data column.

TABLE 1

Example of a data row and a data column

| Row number | Introduction to video content (Text) | Date (Scalar) | Category (Scalar) | Video frame (Vector) |
|---|---|---|---|---|
| 0 | Red cross country vehicle | 2024 Jan. 1 | 1 | xxxxxxx |
| 1 | Running rabbit | 2024 May 10 | 3 | xxxxxxx |

Referring to Table 1, one data row includes data columns respectively corresponding to multiple types of data, where the data column for recording an introduction to video content is corresponding to a text type, the data column for recording date information is corresponding to a scalar type, the data column for recording category information is corresponding to a scalar type, and the data column for recording video frame information is corresponding to vector data.

Then, in step 42, target search is performed based on the target vector data, so as to determine a search result, where the target search includes: separately performing vector search by using a dynamic first index stored in a memory, and a static first index and a second index stored in a distributed file system, and combining results obtained after respective search as a matching result set, where the first index is a memory-based real-time read-write vector graph index, the second index is a disk-based low-cost vector graph index, and the second index is obtained by converting a first index dumped from the memory to a disk. It can be understood that a result may be found only in the first index, or may be found only in the second index, or may be found both in the first index and in the second index.

In some embodiments of this specification, in the target search, used first indexes include two types: One type is dynamic and can be inserted in real time; and the other type is static and is waiting to be replaced with a second index.

In some embodiments of this specification, single mode search of multiple types of data can be provided. For a simple scenario, a standard online analysis, processing, and query capability is provided. In addition to a vector data retrieval capability, a text data retrieval capability can also be included, and multiple recall capabilities are provided for a user.

In some embodiments of this specification, multi-mode hybrid search of multiple types of data can be provided, various complex search semantics and a tree-based hybrid search expression are supported, and multiple types of single-mode search can be flexibly combined, such as performing retrieval on vector data under certain categories of labels and performing vector retrieval on a result set of text retrieval, thereby providing a user with complex recall semantics.

Hybrid search can be performed in combination with two search manners: filtering of another type of data and vector search. A sequence of filtering of another type of data and vector search can be manually configured, or can be automatically generated. Filtering of another type of data can be performed in a predicate filtering manner or a text filtering manner.

Further, the search request further includes a filtering search criterion for another type of data; and the target search further includes: after the vector search, obtaining a filtering result set in a filter manner according to the filtering search criterion; and filtering the matching result set by using the filtering result set, and determining a search result according to a filtering result.

In this example, filtering of another type of data is after vector search, and is thus referred to as post filtering.

Further, the search request further includes a filtering search criterion for another type of data; and the target search further includes: before the vector search, obtaining a filtering result set in a filter manner according to the filtering search criterion; and the vector search includes performing search, by using the first index and the second index, in a sub-search range corresponding to the filtering result set to obtain the matching result set.

In this example, filtering of another type of data is before vector search, and is thus referred to as pre-filtering.

Figure 5:
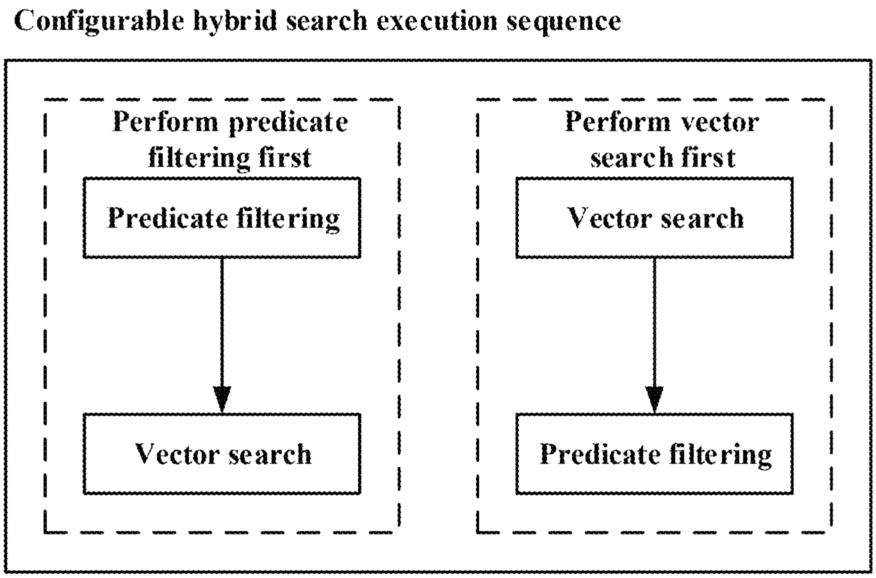
FIG. 5 is a schematic diagram illustrating a hybrid search execution sequence, according to an embodiment.

FIG. 5 is a schematic diagram illustrating a hybrid search execution sequence, according to an embodiment. Referring to FIG. 5, this embodiment of this specification implements efficient search by using a dynamically configurable hybrid search execution sequence. For example, filtering of another type of data is predicate filtering. Predicate filtering can implement filtering of structured data. In a hybrid search mode of vector and structured data, if a filtering rate of the structured data is high, filtering of the structured data is performed first, and then vector searching is performed, to avoid that recalled data when vector search is performed first do not satisfy filtering of the structured data, resulting in a loss of a quantity of recall rows. If the filtering rate of the structured data is low, vector search is performed first, and then filtering of the structured data is performed according to a result of vector search, thereby greatly reducing a calculation amount of subsequent filtering. Search performance is optimized while ensuring the quantity of recalled rows through searching as much as possible.

Further, the obtaining a filtering result set in a filter manner according to the filtering search criterion includes: obtaining several row numbers through searching according to at least one other type of data included in the filtering search criterion, where the row number is used to identify the data row; and determining, as the filtering result set, the several row numbers or vector data of target data columns included in several data rows corresponding to the several row numbers.

Further, the obtaining several row numbers through searching according to at least one other type of data included in the filtering search criterion includes: obtaining a first row number set through searching according to first type of data included in the filtering search criterion; and obtaining, from the first row number set, a second row number set formed by several row numbers through searching according to second type of data included in the filtering search criterion.

Further, the another type of data includes at least one of the following: text data, scalar data, and document data.

Figure 6:
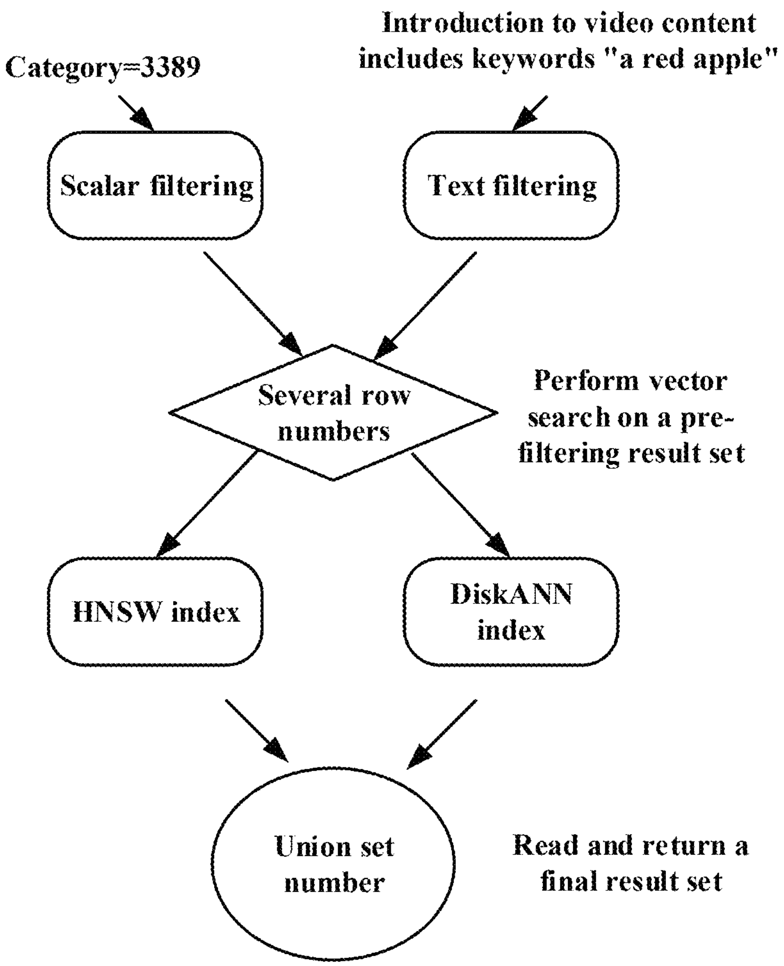
FIG. 6 is a schematic diagram illustrating a hybrid search execution process of multiple types of data, according to an embodiment.

FIG. 6 is a schematic diagram illustrating a hybrid search execution process of multiple types of data, according to an embodiment. Referring to FIG. 6, a first row number set is first obtained through searching based on scalar filtering. For example, a search criterion for scalar filtering is "category=3389", and then a second row number set formed by several row numbers is obtained through searching based on text filtering. For example, a search criterion for text filtering is "introduction to video content includes a keyword "red apple", and then the second row number set or vector data of a target data column included in the several data rows corresponding to the second row number set is determined as a pre-filtering result set. Then, vector search is performed on the pre-filtering result set, and vector search depends on an HNSW index and a DiskANN index. A union set of search results of the two indexes is taken to obtain a union set row number, and finally a final result set is read and returned.

Further, the target search obtains several row numbers matching the target vector data, where the row number is used to identify the data row; and the determining a search result includes: obtaining data information of several target data columns in data rows corresponding to the matched several row numbers and postprocessing information thereof, where the postprocessing information includes statistical information in a search process.

The embodiments of this specification can maximize execution efficiency by performing two phases of search and inverse lookup. A search link is implemented in two phases. In the search phase, a row number is recalled according to a search criterion, and specific content data are not read. In the reverse lookup phase, content data are read and postprocessing information is obtained for the recalled row number, so invalid reading and postprocessing of intermediate recall data are avoided, and execution efficiency is maximized. The postprocessing information can include a matching score, a hit rate, etc.

According to the method for searching vector data in a vector database provided in the embodiments of this specification, first, a search request for target vector data is received; and then, target search is performed based on the target vector data, so as to determine a search result, where the target search includes: separately performing vector search by using a dynamic first index stored in a memory, and a static first index and a second index stored in a distributed file system, and combining results obtained after respective search as a matching result set, where the first index is a memory-based real-time read-write vector graph index, the second index is a disk-based low-cost vector graph index, and the second index is obtained by converting a first index dumped from the memory to a disk. It can be understood from the above-mentioned description that, in the embodiments of this specification, when searching the vector data, both the first index and the second index are used, thereby giving play to advantages of the first index and the second index, thereby enabling both real-time performance and storage costs to be considered.

Figure 7:
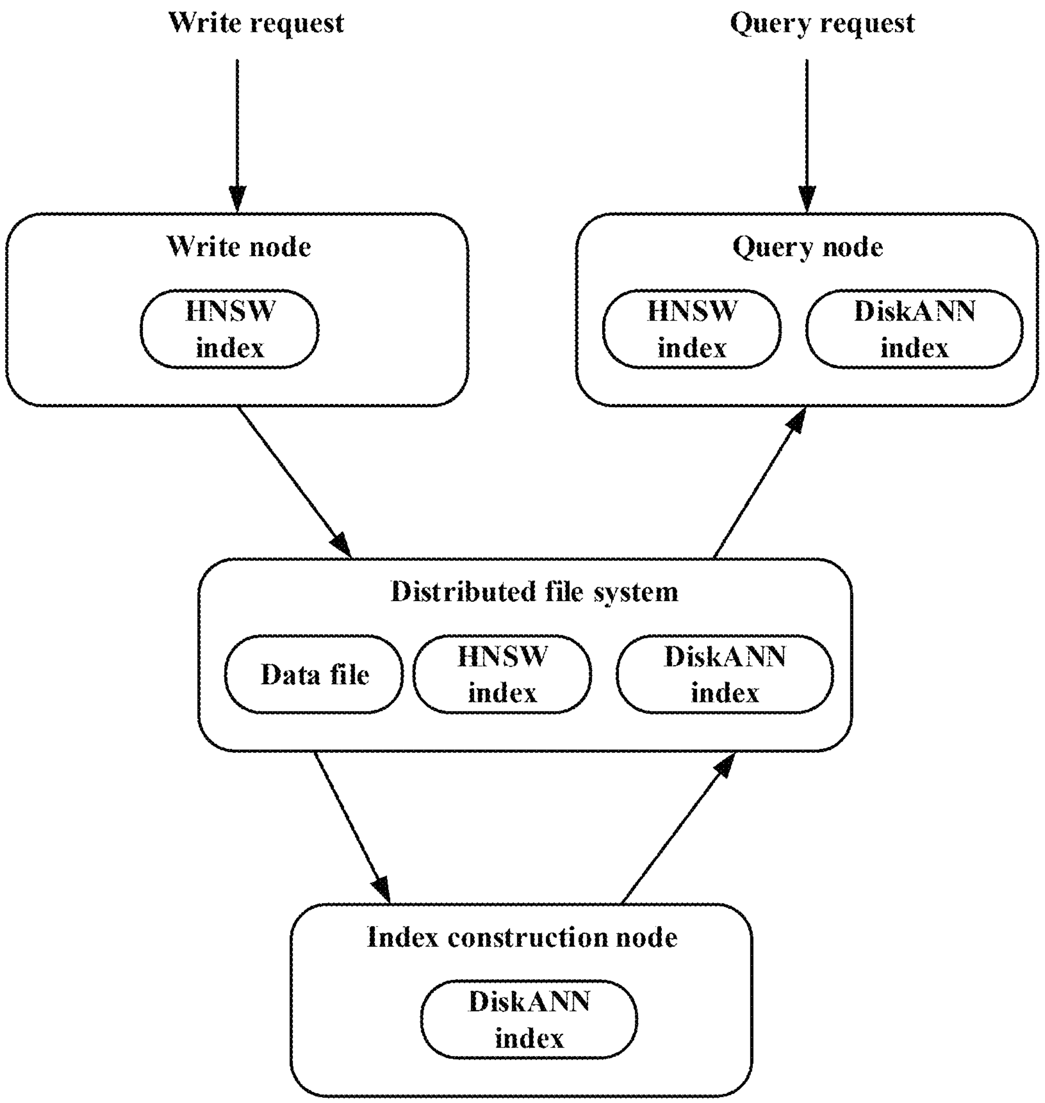
FIG. 7 is a schematic diagram illustrating a processing process of reading and writing vector data from or into a vector database, according to an embodiment.

FIG. 7 is a schematic diagram illustrating a processing process of reading and writing vector data from or into a vector database, according to an embodiment. Referring to FIG. 7, first, after receiving a write request, a write node inserts new vector data into a memory table. When the memory table is flushed to a hard disk, the new vector data and an HNSW index are flushed to a distributed file system, then an index construction node is triggered to construct a DiskANN index for the new vector data, and the DiskANN index is stored into the distributed file system. A query node switches from the HNSW index to the DiskANN index. After the switching is completed, the HNSW index is deleted, so memory space is released. The query node is configured to receive a query request and perform vector query by using hybrid indexes.

Figure 8:
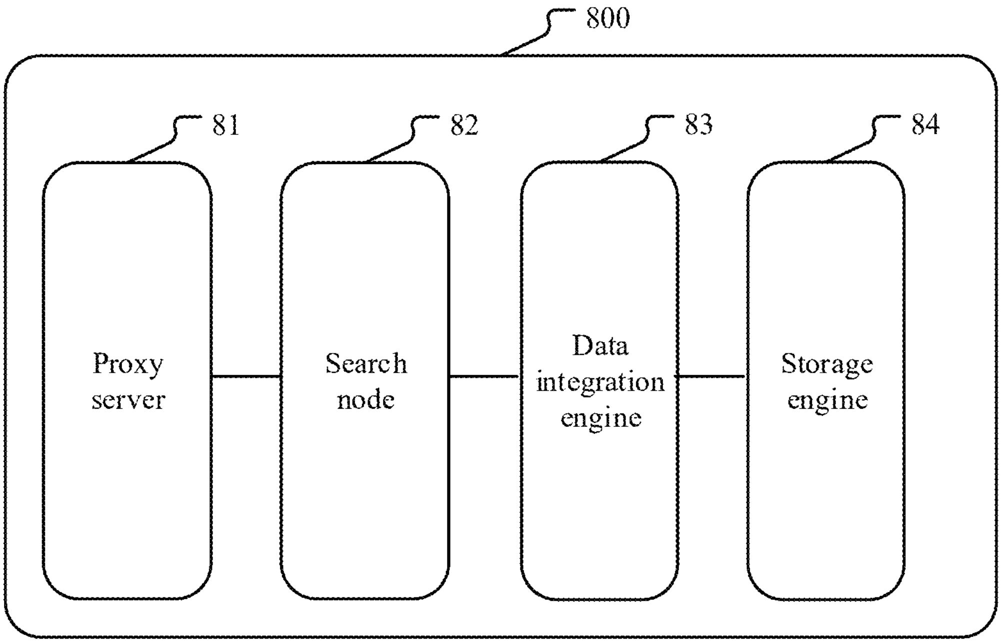
FIG. 8 is a schematic block diagram illustrating an apparatus for writing vector data into a vector database, according to an embodiment.

According to an embodiment of another aspect, an apparatus for writing vector data into a vector database is further provided, and the apparatus is configured to perform the method for writing vector data into a vector database according to the embodiment of this specification. FIG. 8 is a schematic block diagram illustrating an apparatus for writing vector data into a vector database, according to an embodiment. As shown in FIG. 8, the apparatus 800 includes: a proxy server 81, configured to receive a write request for target vector data; a search node 82, configured to add index update information corresponding to the target vector data received by the proxy server 81 to a dynamic first index of a vector database in a memory table, where the first index is a memory-based real-time read-write vector graph index; a data integration engine 83, configured to: when the memory table is flushed to a disk, store the index update information of the dynamic first index in the memory table and added by the search node 82 into a distributed file system to obtain a static first index; and a storage engine 84, configured to convert the static first index in the distributed file system and obtained by the data integration engine 83 into a second index, where the second index is a disk-based low-cost vector graph index.

Optionally, in an embodiment, the storage engine 84 is further configured to combine obtained multiple second indexes whose data volumes are less than a target value into one second index whose data volume is greater than or equal to the target value.

Optionally, in an embodiment, the first index is an HNSW index, and the second index is a DiskANN index.

Further, the index update information includes update of an adjacency relationship in the HNSW index and/or adjustment of a hierarchical structure of multiple hierarchical graphs.

Further, the storage engine 84 includes: an obtaining subunit, configured to obtain a graph structure of a bottom layer in a static HNSW index in the distributed file system, and use the graph structure as a graph structure in DiskANN; a compression subunit, configured to obtain each piece of vector data included in the vector database, and generate a compression vector respectively corresponding to each piece of vector data; and a storage subunit, configured to construct an index file of the second index based on the graph structure obtained by the obtaining subunit and the compression vector obtained by the compression subunit, and store the index file into the distributed file system.

According to the apparatus for writing vector data into a vector database provided in the embodiments of this specification, first, the proxy server 81 receives a write request for target vector data; then, the search node 82 adds index update information corresponding to the target vector data to a dynamic first index of a vector database in a memory table, where the first index is a memory-based real-time read-write vector graph index; further, when the memory table is flushed to a disk, the data integration engine 83 stores the index update information of the dynamic first index in the memory table into a distributed file system to obtain a static first index; and finally, the storage engine 84 converts the static first index in the distributed file system into a second index, where the second index is a disk-based low-cost vector graph index. It can be understood from the above-mentioned description that in the embodiments of this specification, a distributed file system is used to replace local storage, and can be adapted to large-scale vector data. In addition, a composite index solution is used, and a static first index in the distributed file system is converted into a second index, so memory space is released. Subsequently, the first index can be used to service real-time incremental vector data, and the second index can be used to service historical vector data, so both real-time performance and storage costs can be considered.

Figure 9:
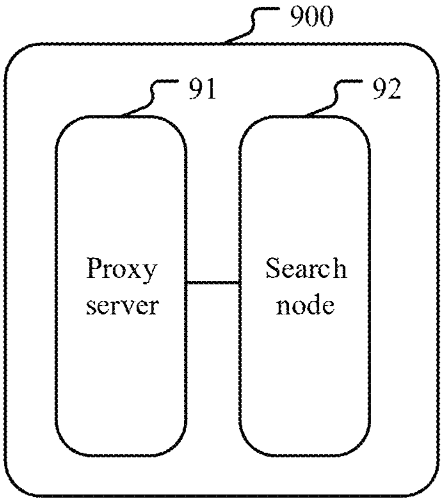
FIG. 9 is a schematic block diagram illustrating an apparatus for searching vector data in a vector database, according to an embodiment.

According to an embodiment of another aspect, an apparatus for searching vector data in a vector database is further provided, and the apparatus is configured to perform the method for searching vector data in a vector database according to the embodiment of this specification. FIG. 9 is a schematic block diagram illustrating an apparatus for searching vector data in a vector database, according to an embodiment. As shown in FIG. 9, the apparatus 900 includes: a proxy server 91, configured to receive a search request for target vector data; and a search node 92, configured to perform target search based on the target vector data received by the proxy server 91, so as to determine a search result, where the target search includes: separately performing vector search by using a dynamic first index stored in a memory, and a static first index and a second index stored in a distributed file system, and combining results obtained after respective search as a matching result set, where the first index is a memory-based real-time read-write vector graph index, the second index is a disk-based low-cost vector graph index, and the second index is obtained by converting a first index dumped from the memory to a disk.

Optionally, in an embodiment, multiple data rows are stored in the vector database, one data row includes data columns respectively corresponding to multiple types of data, and the multiple types of data include vector data and another type of data.

Further, the search request further includes a filtering search criterion for another type of data; and the search node 92 includes: a first filtering subunit, configured to: after the vector search, obtain a filtering result set in a filter manner according to the filtering search criterion; and a second filtering subunit, configured to filter the matching result set by using the filtering result set obtained by the first filtering subunit, and determine a search result according to a filtering result.

Further, the search request further includes a filtering search criterion for another type of data; and the search node 92 includes: a first filtering subunit, configured to: before the vector search, obtain a filtering result set in a filter manner according to the filtering search criterion; and the vector search includes performing search, by using the first index and the second index, in a sub-search range corresponding to the filtering result set obtained by the third filtering subunit to obtain the matching result set.

Further, the obtaining a filtering result set in a filter manner according to the filtering search criterion includes: obtaining several row numbers through searching according to at least one other type of data included in the filtering search criterion, where the row number is used to identify the data row; and determining, as the filtering result set, the several row numbers or vector data of target data columns included in several data rows corresponding to the several row numbers.

Further, the obtaining several row numbers through searching according to at least one other type of data included in the filtering search criterion includes: obtaining a first row number set through searching according to first type of data included in the filtering search criterion; and obtaining, from the first row number set, a second row number set formed by several row numbers through searching according to second type of data included in the filtering search criterion.

Further, the another type of data includes at least one of the following: text data, scalar data, and document data.

Further, the target search obtains several row numbers matching the target vector data, where the row number is used to identify the data row; and the determining a search result includes: obtaining data information of several target data columns in data rows corresponding to the matched several row numbers and postprocessing information thereof, where the postprocessing information includes statistical information in a search process.

According to the apparatus for searching vector data in a vector database provided in the embodiments of this specification, first, the proxy server 91 receives a search request for target vector data; and then, the search node 92 performs target search based on the target vector data, so as to determine a search result, where the target search includes: separately performing vector search by using a dynamic first index stored in a memory, and a static first index and a second index stored in a distributed file system, and combining results obtained after respective search as a matching result set, where the first index is a memory-based real-time read-write vector graph index, the second index is a disk-based low-cost vector graph index, and the second index is obtained by converting a first index dumped from the memory to a disk. It can be understood from the above-mentioned description that, in the embodiments of this specification, when searching the vector data, both the first index and the second index are used, thereby giving play to advantages of the first index and the second index, thereby enabling both real-time performance and storage costs to be considered.

According to an embodiment of another aspect, a computer-readable storage medium is further provided. The computer-readable storage medium stores a computer program, and when the computer program is executed in a computer, the computer is enabled to perform the method described with reference to FIG. 2 or FIG. 4.

According to an embodiment of still another aspect, a computing device is further provided, including a storage device and a processor. Executable code is stored in the storage device, and when the processor executes the executable code, the method described with reference to FIG. 2 or FIG. 4 is implemented.

A person skilled in the art should be aware that in the above-mentioned one or more examples, the functions described in this specification can be implemented by hardware, software, firmware, or any combination thereof. When implemented by using software, these functions can be stored in a computer-readable medium or transmitted as one or more instructions or one or more pieces of code on a computer-readable medium.

The above-mentioned specific implementations further describe in detail the objectives, technical solutions, and beneficial effects of this application. It should be understood that the descriptions above are merely specific implementations of this application and are not intended to limit the protection scope of this application. Any modifications, equivalent replacements, or improvements made on the basis of the technical solutions of this application shall fall within the protection scope of this application.

The invention claimed is:

1. A method, comprising:

receiving a write request for writing target vector data into a vector database, wherein the vector database has a first index and a second index;

in response to receiving the write request, adding index update information corresponding to the target vector data to the first index stored in a memory table, wherein the first index is a memory-based real-time read-write vector graph index;

in response to a size of the memory table exceeding a predetermined value, flushing the memory table to a disk by writing the first index in the memory table into a distributed file system; and converting the first index in the distributed file system into the second index, wherein the second index is a disk-based vector graph index, wherein a graph structure of a bottom layer in the first index is used as a graph structure in the second index.

2. The method according to claim 1, wherein the vector database has multiple second indexes corresponding to multiple batches of vector data, wherein the method further comprises:

combining multiple second indexes whose data volumes are less than a target value into one second index whose data volume is greater than or equal to the target value.

3. The method according to claim 1, wherein the first index is a Hierarchical Navigable Small World (HNSW) index, and the second index is a Disk Approximate Nearest Neighbor (DiskANN) index.

4. The method according to claim 3, wherein the index update information comprises update of an adjacency relationship in the HNSW index or adjustment of a hierarchical structure of multiple hierarchical graphs.

5. The method according to claim 3, wherein converting the first index in the distributed file system into the second index comprises:

obtaining a graph structure of a bottom layer in a static HNSW index in the distributed file system, and using the graph structure as a graph structure in DiskANN;

obtaining each piece of vector data comprised in the vector database, and generating a compression vector corresponding to each piece of vector data; and constructing an index file of the second index based on the graph structure and the compression vector, and storing the index file into the distributed file system.

6. The method according to claim 1, further comprising:

receiving a search request for searching target vector data in a vector database; and performing searching based on the target vector data, wherein performing the searching comprises:

performing a plurality of vector searches by using the first index stored in a memory, and the first index and the second index stored in the distributed file system, respectively; and combining results obtained from the plurality of vector searches as a matching result set.

7. The method according to claim 6, wherein multiple data rows are stored in the vector database, wherein one data row comprises data columns corresponding to multiple types of data, and the multiple types of data comprise vector data and other types of data.

8. The method according to claim 7, wherein the search request comprises a filtering search criterion for filtering the other types of data, and wherein performing the searching further comprises:

after performing the plurality of vector searches, obtaining a filtering result set based on the filtering search criterion; and filtering the matching result set based on the filtering result set, and determining a search result according to a filtered matching result set.

9. The method according to claim 7, wherein the search request further comprises a filtering search criterion for filtering the other types of data, and wherein performing the searching further comprises:

before performing the plurality of vector searches, obtaining a filtering result set based on the filtering search criterion, and wherein the plurality of vector searches are performed, by using the first index and the second index, in a sub-search range corresponding to the filtering result set to obtain the matching result set.

10. The method according to claim 8, wherein obtaining the filtering result set based on the filtering search criterion comprises:

obtaining row numbers through searching based on at least one of the other types of data comprised in the filtering search criterion, wherein the row numbers identify data rows of the vector database; and determining, as the filtering result set, the row numbers or vector data of target data columns comprised in the data rows corresponding to the row numbers.

11. The method according to claim 7, wherein the searching obtains row numbers matching the target vector data, wherein the row numbers identify data rows of the vector database, and wherein the method comprises determining a search result of the searching, comprising:

obtaining data information and postprocessing information of target data columns in the data rows corresponding to matching row numbers, wherein the postprocessing information comprises statistical information during the searching.

12. A non-transitory, computer readable medium storing one or more instructions executable by a computer system to perform operations comprising:

receiving a write request for writing target vector data into a vector database, wherein the vector database has a first index and a second index;

in response to receiving the write request, adding index update information corresponding to the target vector data to the first index in a memory table, wherein the first index is a memory-based real-time read-write vector graph index;

in response a size of the memory table exceeding a predetermined value, flushing the memory table to a disk by writing the first index in the memory table into a distributed file system; and converting the first index in the distributed file system into the second index, wherein the second index is a disk-based vector graph index, wherein a graph structure of a bottom layer in the first index is used as a graph structure in the second index.

13. The non-transitory, computer readable medium of claim 12, wherein the vector database has multiple second indexes corresponding to multiple batches of vector data, wherein, and wherein the operations further comprise:

combining multiple second indexes whose data volumes are less than a target value into one second index whose data volume is greater than or equal to the target value.

14. The non-transitory, computer readable medium of claim 12, wherein the first index is a Hierarchical Navigable Small World (HNSW) index, and the second index is a Disk Approximate Nearest Neighbor (DiskANN) index.

15. The non-transitory, computer readable medium of claim 14, wherein the index update information comprises update of an adjacency relationship in the HNSW index or adjustment of a hierarchical structure of multiple hierarchical graphs.

16. The non-transitory, computer readable medium of claim 14, wherein converting the first index in the distributed file system into the second index comprises:

obtaining a graph structure of a bottom layer in a static HNSW index in the distributed file system, and using the graph structure as a graph structure in DiskANN;

obtaining each piece of vector data comprised in the vector database, and generating a compression vector corresponding to each piece of vector data; and constructing an index file of the second index based on the graph structure and the compression vector, and storing the index file into the distributed file system.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving a search request for searching target vector data in a vector database; and performing searching based on the target vector data, wherein performing the searching comprises:

performing a plurality of vector searches by using a first index stored in a memory, and the first index and a second index stored in a distributed file system, respectively, wherein the first index is memory-based real-time vector graph index, the second index is a disk-based vector graph index, wherein the second index is obtained by converting the first index stored in the distributed file system, wherein a graph structure of a bottom layer in the first index is used as a graph structure in the second index; and combining results obtained from the plurality of vector searches as a matching result set.

18. The computer-implemented system of claim 17, wherein multiple data rows are stored in the vector database, wherein one data row comprises data columns corresponding to multiple types of data, and the multiple types of data comprise vector data and other types of data.

19. The computer-implemented system of claim 18, wherein the search request comprises a filtering search criterion for filtering the other types of data, and wherein performing the searching further comprises:

after performing the plurality of vector searches, obtaining a filtering result set based on the filtering search criterion; and filtering the matching result set based on the filtering result set, and determining a search result according to a filtered matching result set.

20. The computer-implemented system of claim 19, wherein obtaining the filtering result set based on the filtering search criterion comprises:

obtaining row numbers through searching based on at least one of the other types of data comprised in the filtering search criterion, wherein the row numbers identify data rows of the vector database; and determining, as the filtering result set, the row numbers or vector data of target data columns comprised in the data rows corresponding to the row numbers.

* * * * *